(12) United States Patent
Li et al.

(10) Patent No.: US 6,932,881 B2
(45) Date of Patent: Aug. 23, 2005

(54) METHOD OF THREE DIMENSIONAL SURFACE COATING

(75) Inventors: William G. Li, Baldwin Park, CA (US); Jeffrey H. Merza, Baldwin Park, CA (US); Michael Kidakarn, Baldwin Park, CA (US); Shu-Ming Ho, Baldwin Park, CA (US)

(73) Assignee: ADS Enterprise DBA Naki World, Walnut, CA (US)

( * ) Notice: Subject to any disclaimer, the term of this patent is extended or adjusted under 35 U.S.C. 154(b) by 0 days.

(21) Appl. No.: 10/658,088

(22) Filed: Sep. 10, 2003

(65) Prior Publication Data
US 2005/0053726 A1 Mar. 10, 2005

(51) Int. Cl.$^7$ .......................... B32B 31/06; B32B 31/12; B32B 33/00; B05D 1/38
(52) U.S. Cl. ................. 156/280; 156/307.3; 156/307.7; 427/258; 427/407.1
(58) Field of Search .................................. 156/278, 280, 156/297–300, 307.3, 307.4, 307.7; 427/209, 210, 258, 333, 402, 403, 407.1

(56) References Cited

U.S. PATENT DOCUMENTS 5,931,566 A * 8/1999 Fraizer ........................ 362/293
6,346,315 B1 * 2/2002 Sawatsky ..................... 428/201

FOREIGN PATENT DOCUMENTS

JP           2003-290713 A  * 10/2003   ............ B05D/7/02

OTHER PUBLICATIONS

English Abstract of JP 2003–290713.*
English Machine translation of JP 2003–290713.*

* cited by examiner

Primary Examiner—Chris Fiorilla
Assistant Examiner—Sing P Chan
(74) Attorney, Agent, or Firm—Raymond Y. Chan; David and Raymond

(57) ABSTRACT

A coating method for a work piece includes the steps of: coating a coating film as a base color layer on a treating surface of the work piece, wherein the coating film has a predetermined color provided thereon; coating a first transparent protective layer on the coating film to protect the coating film; attaching a sticker layer having a predetermined character pattern on the first transparent protective layer under a water treatment such that the character pattern of the sticker layer is projected from the coating film to form a three-dimensional appearance; and coating a second transparent protective layer on the first transparent protective layer to sealedly enclose the sticker layer between the first transparent protective layer and the second protective layer so as to form a three-dimensional customary coating layer on the work piece.

20 Claims, 3 Drawing Sheets

METHOD OF THREE DIMENSIONAL SURFACE COATING

BACKGROUND OF THE PRESENT INVENTION

1. Field of Invention

The present invention relates to coating, and more particularly to a method of three dimensional surface coating which is capable of substantially overcoming a conventional difficulty of ineffective coating on surfaces having uniform or complicated surface roundness and/or acute corners.

2. Description of Related Arts

Various methods of coating or painting have been developed to enhance the appearance of particular work pieces so that the work pieces having a fancy or relevant decoration painted or coated thereon will have enhanced marketability or advertising capability.

One of the simplest and conventional methods for painting a metal or plastic article generally comprises the steps of dipping said article in a mixture of varnish and silicone rubber so as to form a protective film on the surface thereof; and bake varnishing the article at a predetermined temperature range. The resulting article is usually coated with a predetermined monochromatic paint.

Yet another simplest conventional method of painting onto a surface for industrial purpose is to utilize a cylindrically shaped paint applicator, which is essentially a roller. The roller is first dipped into a supply of paint, with some of the paint being absorbed in the roller, and then the roller is carried on to the surface so that the paint can be applied thereto. Various powered painting systems have been developed wherein the paint is delivered under a powered system to the paint applicator. The paint applicator is then driven to paint the work piece in question. For some sophisticated systems, a plurality of paint applicators and computer programs or some other sorts of information technology are implemented to assist the painting method so that the system is capable of painting complex and aesthetically sophisticated graphics.

There exist some discrepancies among the above-mentioned conventional methods for painting. Specifically, one major problem is one which involves paint non-uniformity on the surface of the relevant work pieces. This phenomenon is not particularly pressing in work pieces having a fairly large working surface which is to be painted, but the situation will be severely deteriorated when the work piece itself is of complicated external shape, such as a highly complex robot model, in which both rounded and acute corners are plentiful. As a result, for such kind of work pieces, conventional painting methods are of little practical value in that the ultimate quality of painting may be unsatisfactory, if not poor.

In addition, such painting method cannot be utilized under certain conditions. For example, when the work piece is made of metal, the paint cannot be substantially coated on the surface of the metal. In other words, the paint layer will be eventually peeled off from the metal made work piece. Therefore, the painting method is limited by the material of the work piece.

With the advance of information technology, as mentioned earlier, sophisticated systems have existed to deal with some more complicated work pieces. More specifically, computerized probing and painting equipments may be utilized so that painting takes place in a piece meal manner on the surface of the relevant work piece in accordance with a predetermined painting pattern created through a computer program. As such, complicated painting patterns can be created. Moreover, ultra-mini painting equipments have been developed to deal with the acute corners on the work piece. The scenario may sound good, but it is worth pointing out that advanced technology means higher cost and more expensive equipments. This increase in manufacturing costs inevitably leads to increase in selling price, usually severely. This increase in selling price may not cause any problem in that for some high-end product, the cost for manufacturing the product itself may well go above the cost for painting. Yet for some low-end products, the relative cost of painting to manufacturing may be unreasonably high.

Moreover, even though multiple painting layers are overlappedly coated on the work piece, such painting method cannot provide a three-dimensional decoration for the work piece. In other words, the multiple painting layers can only enhance the durability of the coating.

It may be arguable, that other methods of enriching the appearance of the work piece exist, such as chemical coating. However, it should bear in mind that other method involves some other disadvantages. Some are even worse than that of the above-mentioned conventional painting method!

SUMMARY OF THE PRESENT INVENTION

The main object of the present invention is to provide a method of surface coating which is capable of substantially overcoming a conventional difficulty of ineffective coating on a treating surface of a work piece having non-uniform or complicated surface roundness and/or acute corner.

Another object of the present invention is to provide a method of surface coating which provides a multi-coating layer on the work piece to form a three-dimensional decoration for enhancing the visual impact of the work piece, so as to give the work piece luster and durability.

Another object of the present invention is to provide a method of surface coating which is suitable for a wide range of three-dimensional work piece.

Another object of the present invention is to provide a method of surface coating which utilizes uniform water pressure to achieve a substantially uniform and high coating quality on the relevant work piece.

Another object of the present invention is to provide a method of surface coating which does not involve any complicated or expensive equipments so as to minimize the running cost of the present invention.

Another object of the present invention is to provide a method of surface coating which is easy and economical to operate.

Accordingly, in order to accompany the above objects, the present invention provides a method of color coating on a work piece having a treating surface, comprising the steps of:

(a) coating a coating film as a base color layer on the treating surface of the work piece, wherein the coating film has a predetermined color provided thereon;

(b) coating a first transparent protective layer on the coating film to protect the coating film;

(c) attaching a sticker layer having a predetermined character pattern on the first transparent protective layer under a water treatment such that the character pattern of the sticker layer is projected from the coating film to form a three-dimensional appearance; and (d) coating a second transparent protective layer on the first transparent protective layer to sealedly enclose the sticker layer between the first transparent protective layer and the second protective layer so as to form a three-dimensional customary coating layer on the work piece.

These and other objectives, features, and advantages of the present invention will become apparent from the following detailed description, the accompanying drawings, and the appended claims.

DETAILED DESCRIPTION OF THE PREFERRED EMBODIMENT

Figure 1:
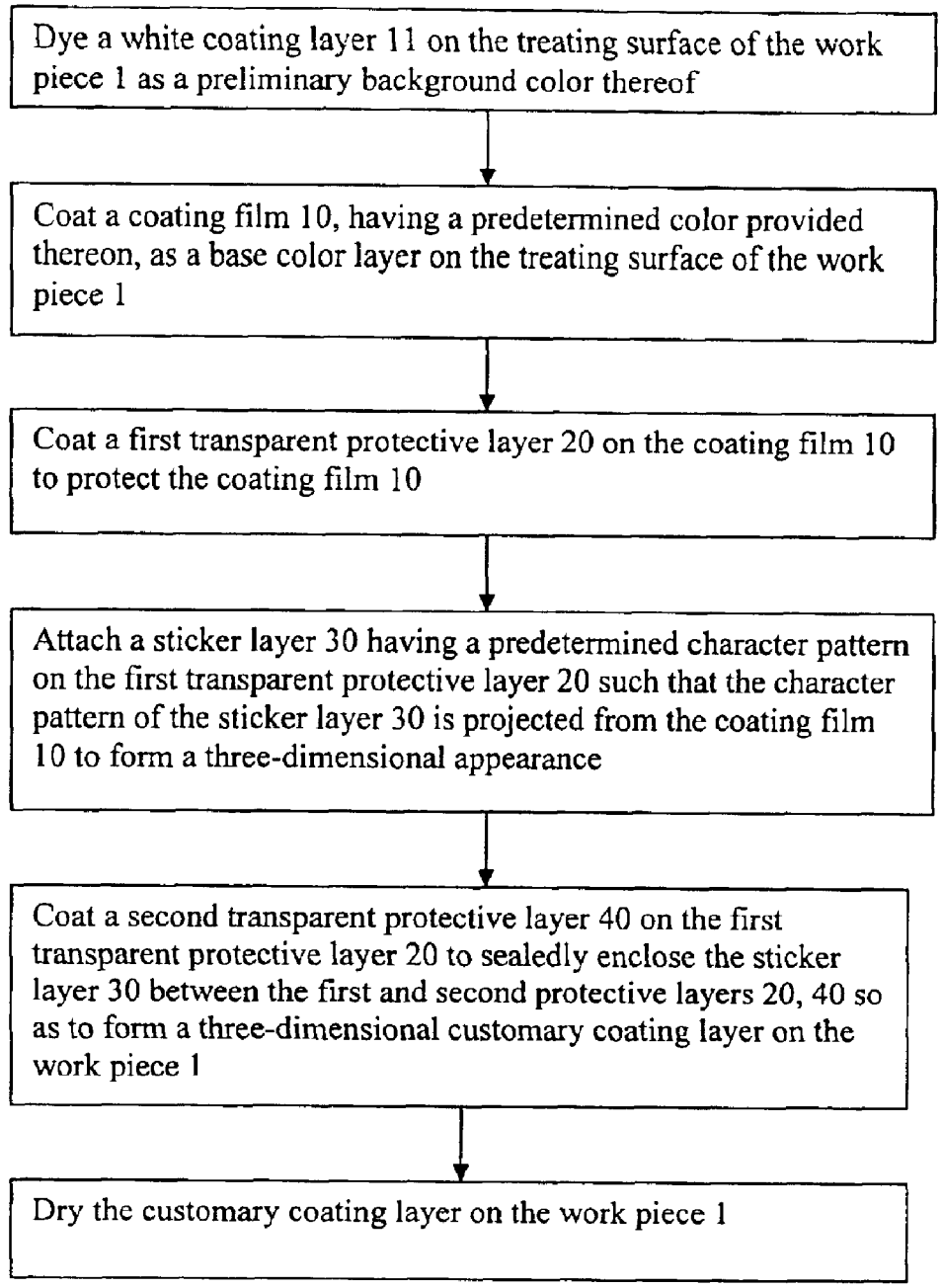
FIG. 1 is a flow diagram of a method of three-dimensional surface coating for a work piece according to a preferred embodiment of the present invention.
Figure 3:
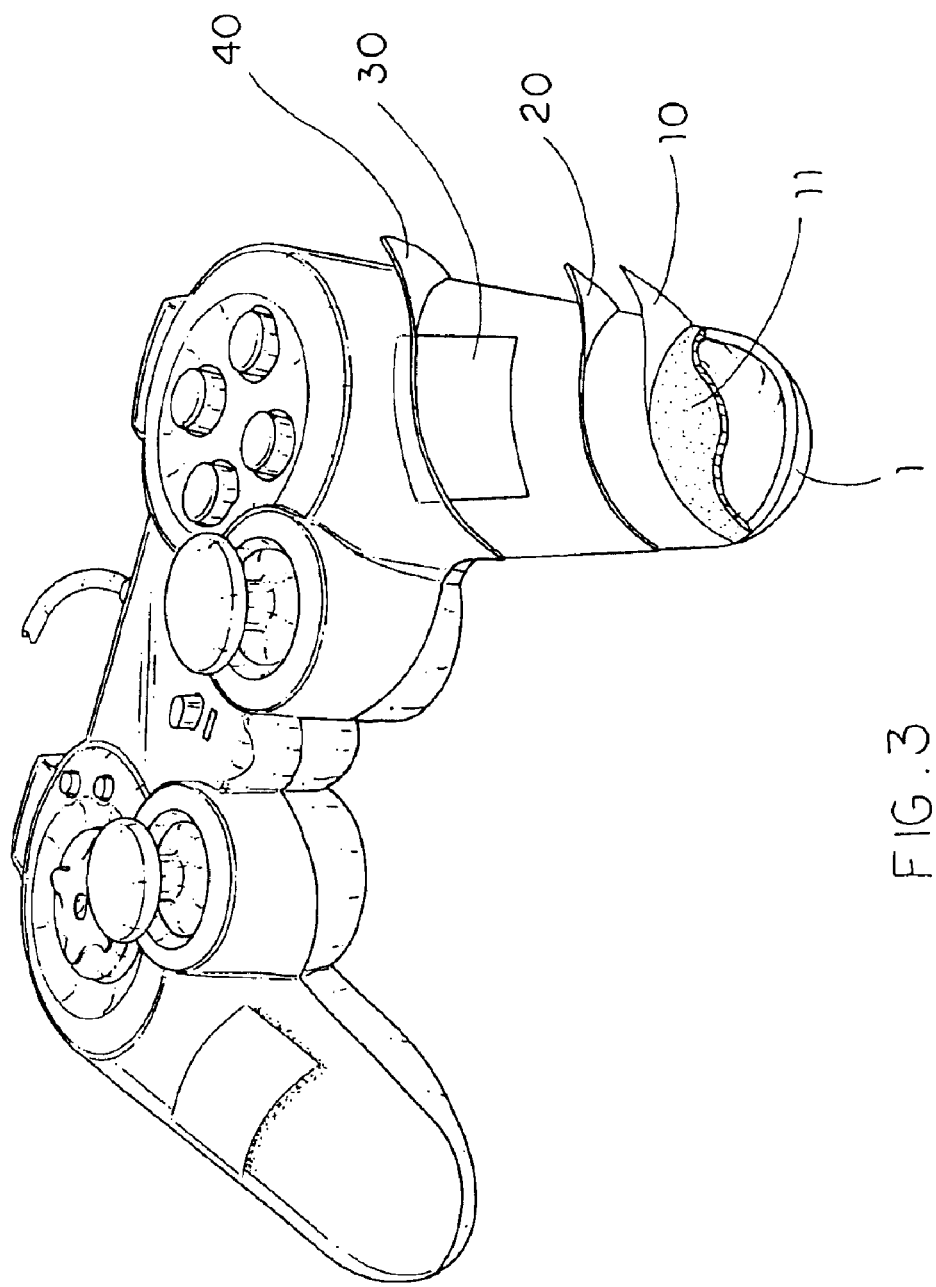
FIG. 3 illustrates the three-dimensional customary coating layer on the work piece by using the coating method according to the above preferred embodiment of the present invention.

Referring to FIGS. 1 and 3 of the drawings, a method of three-dimensional surface coating on a work piece 1 according to a preferred embodiment of the present invention is illustrated. The coating method is adapted to coat on a treating surface of the work piece 1 to form an essentially three-dimensional object. The coating method comprises the following steps.

(1) Coat a coating film 10 as a base color layer on the treating surface of the work piece 1, wherein the coating film 10 has a predetermined color provided thereon.

(2) Coat a first transparent protective layer 20 on the coating film 10 to protect the coating film 10.

(3) Attach a sticker layer 30 having a predetermined character pattern on the first transparent protective layer 20 under a water treatment such that the character pattern of the sticker layer 30 is projected from the coating film 10 to form a three-dimensional appearance.

(4) Coat a second transparent protective layer 40 on the first transparent protective layer 20 to sealedly enclose the sticker layer 30 between the first transparent protective layer 20 and the second protective layer 40 so as to form a three-dimensional customary coating layer on the work piece 1.

Figure 2:
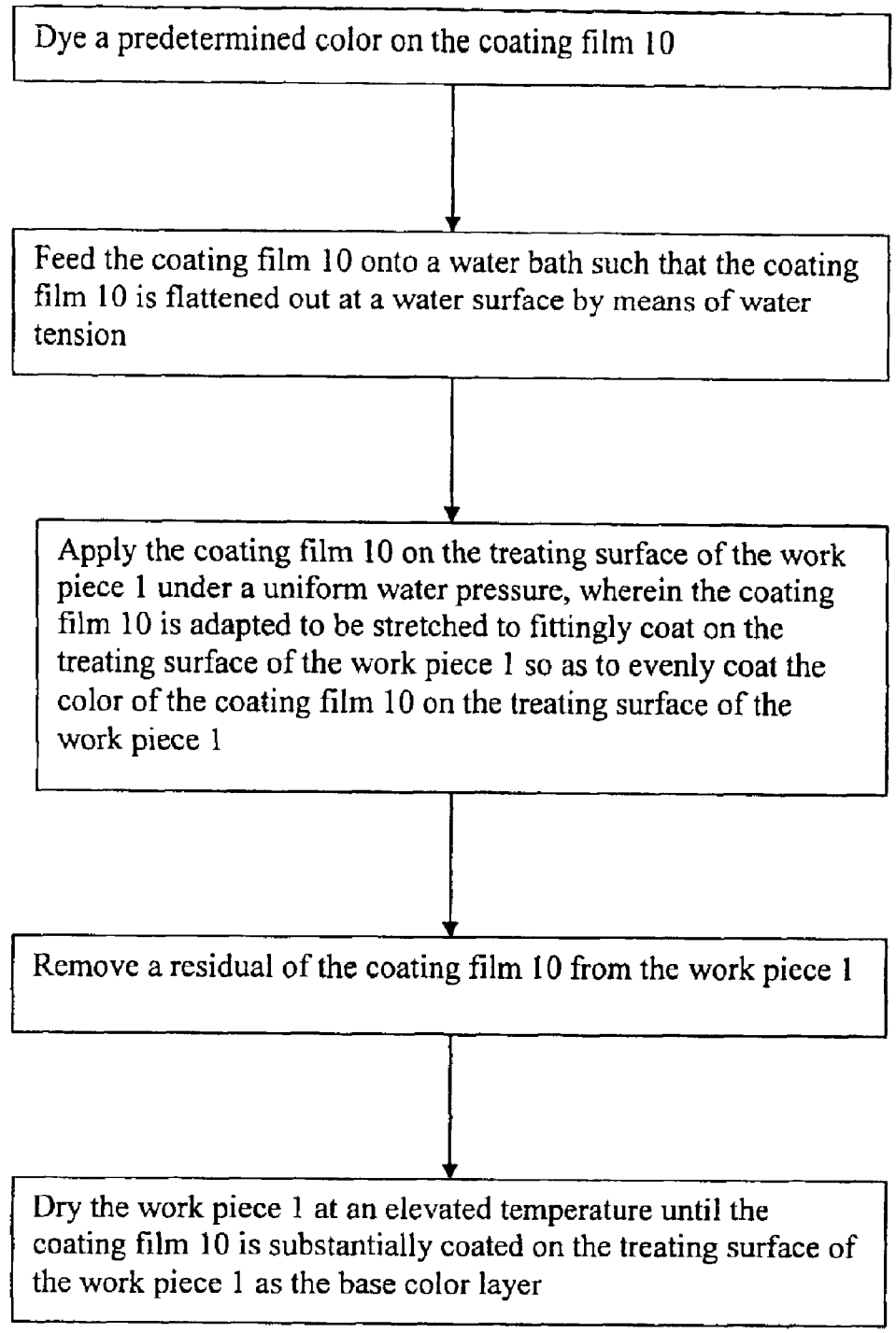
FIG. 2 is a flow diagram of the method of coating the coating film on the treating surface of the work piece according to the above preferred embodiment of the present invention, illustrating the steps for enhancing the quality and flexibility of the coating.

Referring to FIG. 2 of the drawings, the coating film 10 can be embodied as a base color layer for decoration and durability purposes. In order to further enhance the flexibility and quality of the coating method of the present invention, the step (1) comprises the following steps.

(1.1) Dye a predetermined color on the coating film 10.

(1.2) Feed the coating film 10 onto a water bath such that the coating film 10 is flattened out at a water surface by means of water tension.

(1.3) Apply the coating film 10 on the treating surface of the work piece 1 under a uniform water pressure, wherein the coating film 10 is adapted to be stretched to fittingly coat on the treating surface of the work piece 1 so as to evenly coat the color of the coating film 10 on the treating surface of the work piece 1.

(1.4) Remove a residual of the coating film 10 from the work piece 1.

(1.5) Dry the work piece 1 at an elevated temperature until the coating film 10 is substantially coated on the treating surface of the work piece 1 as the base color layer.

According to the preferred embodiment, the work piece 1 which is to be dyed is preferably made of plastic material, such as polyvinyl chloride (PVC). Alternatively, the work piece 1 can be made of a wide variety of materials, such as various kinds of metal except mercury, since the coating film 10 is coated on the work piece 1 as the base color layer. In other words, the work piece does not limit by its material to utilize the coating method of the present invention in comparison with the conventional painting method that the paint may accidentally peeling off from the work piece 1 after a period of time.

Similarly, the work piece 1 can be of a wide variety of shapes, including those irregular shapes which are made specifically for particular purposes, such as a model airplane. In practice, as long as the work piece 1 is waterproof, i.e. it will not suffer significant distortion in physically and chemically when immerse into the water bath, it is suitable for being coated according to the preferred embodiment of the present invention.

According to the preferred embodiment, before the step (1.3), the coating method further comprises the steps of dying a white coating layer 11 on the treating surface of the work piece 1 as a preliminary background color thereof.

Note that PVC as a raw material which is to be used to fabricate the work piece 1 is usually transparent in color. As a result, the white coating layer 11 is formed by spraying to provide a preliminary background color so as to enhance the quality of the subsequent color coating. It is worth to mention that the treating surface of the work piece 1 should be cleaned before the white coating layer 11 is coated on the treating surface of the work piece 1. It is worth to mention that the white coating layer 11 should be provided at an inner side of the work piece 1 when the work piece 1 is made transparent material for enhancing the three-dimensional visual image of the work piece 1.

In step (1) above, the coating film 10 is preferably embodied as a high polymer thin film pre-dyed with a predetermined color, wherein the color pre-dyed is to be utilized to dye the work piece 1 in question. The high polymer thin film will be softened when being subjected to water or any other suitable liquid. Hence, the high polymer thin film, when softened, has a flexibility which is capable of forming a wide variety of shapes having subject to appropriate pressure or forces.

According to the preferred embodiment, when the coating film 10 is fed on the water bath in step (1.2), the water in the water bath not only softens the coating film 10 but also provides a water pressure to float the coating film 10 at the water level in such a manner that the water tension will stretch out the coating film 10 in a flattened manner.

In step (1.3), the work piece 1 is immersed into the water bath in such a manner that the softened coating film 10 is capable of, driven by uniform water pressure in the water bath, fittedly embedding the work piece 1 so as to dye the treating surface thereof with the predetermined color of the coating film 10. It is worth to mention that in step (1.2), the coating film 10 is horizontally immersed into the water bath so as to easily align with the work piece 1.

Note that normal water pressure in the water bath would drive the softened high polymer thin film to fittedly align with the work piece 1. Therefore when the high polymer thin film is in physical communication with the treating surface of the work piece 1, the pre-dyed color on the high polymer thin film is coated on the treating surface of the work piece 1. As the work piece 1 is as well immersed in the water bath, all treating surfaces of the work piece 1 will therefore subject to the same water pressure so as to achieve a uniform dyeing. Moreover, as the whole work piece 1, including those areas which are hard to reach by conventional dyeing method such as acute corners, is subject to the same water pressure, uniform dyeing is achieved in those areas as well.

Moreover, step (1.4) mentioned above comprises the step of rinsing the work piece 1 with water so as to remove the residual of the coating film 10 off the work piece 1. As the work piece 1 is now dyed with the predetermined color, it is worth mentioning that the rinsing should be gentle in order not to affect in any way the dyeing on the work piece 1.

In step (1.5) above, the drying of work piece 1 can be accomplished by placing the work piece 1 in an oven or an industrial furnace set at an elevated temperature so as to dismantle any water droplets or vapor attached on the treating surfaces of the work piece 1. Furthermore, the drying process is utilized to consolidate the dye on the treating surfaces so that the dye can be durably coated on the work piece 1.

In step (2), the first transparent protective layer 20 is embodied as a transparent coat which serves as an isolating layer between the sticker layer 30 and the coating film 10, such that the sticker layer 30 visually floats on the coating film 10 through the first transparent layer 20 to create a three-dimensional image. In addition, the first transparent protective layer 20, which is preferably sprayed on the coating film 10, also functions as a protective layer to shield the coating film 10 on the work piece 1.

It is worth to mention that since the coating film 10 is attached on the treating surface of the work piece 1, the first transparent protective layer 20 can be substantially coated thereon so as to prevent the coating film 10 from accidentally peeling off from the work piece 1 after a period of time. In other words, the coating method of the present invention can be used for the work piece without limiting by its material.

In step (3), the process of attaching the sticker layer 30 on the first transparent protective layer 20 is preferably operated under the water treatment wherein the sticker layer 30, having a predetermined character pattern such as fancy character's figurine or a trademark, is adapted to adjustably align on the first transparent protective layer 20 under the water treatment. Therefore, multiple layers of coating is formed on the treating surface of the work piece 1 so as to form a three-dimensional decoration for the work piece 1 to enhance the visual impact thereof.

It is worth to .mention that the sticker layer 30 is capable of moving along the first transparent protective layer 20 so as to selectively adjust the position of the sticker layer 30 on the treating surface of the work piece 1. It is worth to mention that when the sticker layer 30 is attached on the first transparent protective layer 20, the water bubble therebetween should be pressed to release out of the sticker layer 30 so that the sticker layer 22 is fittingly overlapped on the first transparent protective layer 20.

Step (4) is utilized to apply the second protective layer 40 to protect the sticker layer 30 which has been dyed on the work piece 1 by spraying. Therefore, the three-dimensional decoration of the work piece 1 is formed by creating the relatively difference of depth between the coating film 10 and the sticker layer 30 via the first and second transparent layers 20, 40. Again, the second protective layer 40 is transparent in color so that no interference of appearance to the work piece 1 would be resulted.

The coating method further comprises the following step.

(5) Dry the customary coating layer on the work piece 1.

In step (5), the method of dying the customary coating layer is preferably by means of putting the work piece 1 in an oven or industrial furnace at an elevated temperature, wherein any water droplets or vapor will be dried out and that the first transparent protective layer 20, the sticker layer 30 and the second transparent protective layer 40 are formed as an integral layer and will be ultimately consolidated to form the customary coat.

In order to assure the quality of the coating of the present invention, before the step (4), the coating method further comprises an additional step of assessing the work piece 1 to fix a disfigured portion of the first transparent protective layer 20. The assessing and fixing processes could be achieved manually or, more efficiently, achieved by computer monitoring and controlling methodology.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A method of coating on a work piece having a treating surface, comprising the steps of:
   (a) coating a coating film as a base color layer on said treating surface of said work piece, wherein said coating film has a predetermined color provided thereon, wherein the step (a) further comprises the steps of:
      (a.1) dying said color on said coating film;
      (a.2) feeding said coating film onto a water bath such that said coating film is flattened out at a water surface by means of water tension;
      (a.3) applying said coating film on said treating surface of said work piece under a uniform water pressure, wherein said coating film is adapted to be stretched to fittingly coat on said treating surface of said work piece so as to evenly coat said color of said coating film on said treating surface of said work piece;
      (a.4) removing a residual of said coating film from said work piece; and
      (a.5) drying said work piece at an elevated temperature until said coating film is substantially coated on said treating surface of said work piece as said base color layer;
   (b) coating a first transparent protective layer on said coating film to protect said coating film;
   (c) attaching a sticker layer having a predetermined character pattern on said first transparent protective layer such that said character pattern of said sticker layer is projected from said coating film to form a three-dimensional appearance; and
   (d) coating a second transparent protective layer on said first transparent protective layer to sealedly enclose said sticker layer between said first transparent protective layer and said second protective layer so as to form a three-dimensional customary coating layer on said work piece.

2. The coating method as recited in claim 1, in step (a.2), further comprising a step of softening said coating film in said water bath such that said coating film is fittingly aligned on said treating surface of said work piece, so as to evenly coat said color on said treating surface of said work piece through said water pressure.

3. The coating method as recited in claim 2, before step (a.3), further comprising a step of dying a white coating layer on said treating surface of said work piece as a preliminary background color thereof.

4. The coating method as recited in claim 2, in step (a.4), further comprising a step of rinsing said work piece with water to remove said residual of said coating film from said work piece.

5. The coating method, as recited in claim 4, wherein said coating film is a high polymer thin film attached on said treating surface of said work piece.

6. The coating method as recited in claim 4, in step (c), wherein said sticker layer on said first transparent protective layer is operated under a water treatment such that said sticker layer is adapted to adjustably move on said secondary background layer so as to selectively align said sticker layer at a desired position with respect to said work piece under said water treatment.

7. The coating method, as recited in claim 4, further comprising a step of drying said customary coating layer on said work piece such that said first transparent protective layer, said sticker layer and said second transparent protective layer are formed as an integral layer.

8. The coating method as recited in claim 4, before step (a.3), further comprising a step of dying a white coating layer on said treating surface of said work piece as a preliminary background color thereof.

9. The coating method as recited in claim 8, in step (c), wherein said sticker layer on said first transparent protective layer is operated under a water treatment such that said sticker layer is adapted to adjustably move on said secondary background layer so as to selectively align said sticker layer at a desired position with respect to said work piece under said water treatment.

10. The coating method as recited in claim 8, before step (d), further comprising a step of assessing said work piece to fix a disfigured portion of said first transparent protective layer.

11. The coating method, as recited in claim 8, wherein said coating film is a high polymer thin film attached on said treating surface of said work piece.

12. The coating method, as recited in claim 11, further comprising a step of drying said customary coating layer on said work piece such that said first transparent protective layer, said sticker layer and said second transparent protective layer are formed as an integral layer.

13. The coating method as recited in claim 11, in step (c), wherein said sticker layer on said first transparent protective layer is operated under a water treatment such that said sticker layer is adapted to adjustably move on said secondary background layer so as to selectively align said sticker layer at a desired position with respect to said work piece under said water treatment.

14. The coating method as recited in claim 13, before step (d), further comprising a step of assessing said work piece to fix a disfigured portion of said secondary background layer.

15. The coating method, as recited in claim 13, further comprising a step of drying said customary coating layer on said work piece such that said first transparent protective layer, said sticker layer and said second transparent protective layer are formed as an integral layer.

16. The coating method as recited in claim 15, before step (d), further comprising a step of assessing said work piece to fix a disfigured portion of said secondary background layer.

17. The coating method as recited in claim 1, in step (a.4), further comprising a step of rinsing said work piece with water to remove said residual of said coating film from said work piece.

18. The coating method as recited in claim 1, before step (a.3), further comprising a step of dying a white coating layer on said treating surface of said work piece as a preliminary background color thereof.

19. The coating method, as recited in claim 1, wherein said coating film is a high polymer thin film attached on said treating surface of said work piece.

20. The coating method as recited in claim 1, in step (c), wherein said sticker layer on said first transparent protective layer is operated under a water treatment such that said sticker layer is adapted to adjustably move on said secondary background layer so as to selectively align said sticker layer at a desired position with respect to said work piece under said water treatment.

* * * * *